US012385625B1

(12) United States Patent
Hwang

(10) Patent No.: US 12,385,625 B1
(45) Date of Patent: Aug. 12, 2025

(54) PRESSURE-RESISTANT OUTDOOR LAMP STRUCTURE

(71) Applicant: METROMAX AMERICA CORPORATION, Rowland Heights, CA (US)

(72) Inventor: Christina Hwang, Rowland Heights, CA (US)

(73) Assignee: METROMAX AMERICA CORPORATION, Rowland Heights, CA (US)

( * ) Notice: Subject to any disclaimer, the term of this patent is extended or adjusted under 35 U.S.C. 154(b) by 0 days.

(21) Appl. No.: 18/894,236

(22) Filed: Sep. 24, 2024

(51) Int. Cl.

| | |
|---|---|
| ***F21V 15/01*** | (2006.01) |
| ***F21S 8/00*** | (2006.01) |
| ***F21S 9/03*** | (2006.01) |
| ***F21V 17/12*** | (2006.01) |
| ***F21V 21/08*** | (2006.01) |
| ***F21V 23/04*** | (2006.01) |
| ***F21V 23/06*** | (2006.01) |
| ***F21V 31/00*** | (2006.01) |
| *F21Y 113/00* | (2016.01) |

(52) U.S. Cl.
CPC .............. *F21V 15/01* (2013.01); *F21S 8/032* (2013.01); *F21S 9/037* (2013.01); *F21V 17/12* (2013.01); *F21V 21/0824* (2013.01); *F21V 23/04* (2013.01); *F21V 23/06* (2013.01); *F21V 31/00* (2013.01); *F21Y 2113/00* (2013.01)

(58) Field of Classification Search
CPC ...... F21V 15/01; F21V 17/12; F21V 21/0824; F21V 23/04; F21V 23/06; F21V 31/00; F21S 8/032; F21S 9/037; F21Y 2113/00
See application file for complete search history.

(56) References Cited

U.S. PATENT DOCUMENTS

| | | | | |
|---|---|---|---|---|
| 10,619,810 | B1 | 4/2020 | Hwang | |
| 10,995,918 | B1 | 5/2021 | Hwang | |
| 11,333,333 | B1 | 5/2022 | Hwang | |
| 12,152,755 | B1 * | 11/2024 | Hwang | F21S 9/03 |
| 2002/0176248 | A1 * | 11/2002 | Wismeth | F21V 15/01 362/159 |
| 2013/0049609 | A1 * | 2/2013 | Browder | F21S 8/081 315/159 |

* cited by examiner

*Primary Examiner* — Bao Q Truong
(74) *Attorney, Agent, or Firm* — BACON & THOMAS, PLLC

(57) ABSTRACT

A pressure-resistant outdoor lamp structure includes a solar lighting module installed between a base and a lamp cover, and a first pressure-resistant module with a plastic ring clamped and fixed between the base and the lamp cover, and a multiple of first plastic blocks extending outward from the plastic ring and the first plastic blocks are spaced from each other and arranged on an outer periphery wall of the base, such that a flexible plastic material can be set around the periphery of the outdoor lamp to enhance the ability of the outdoor lamp to resist and buffer external impact and compression.

13 Claims, 11 Drawing Sheets

PRESSURE-RESISTANT OUTDOOR LAMP STRUCTURE

FIELD OF THE DISCLOSURE

The present disclosure relates to a pressure-resistant outdoor lamp structure, and more particularly to an outdoor disc solar lamp that can be plugged into an outdoor ground or fixed to any plane, especially the outdoor disc solar lamp with a flexible plastic material set on the outer periphery of the outdoor disc solar lamp to enhance the ability of resisting external impact and compression.

BACKGROUND OF THE DISCLOSURE

In general, outdoor lamps are often used in gardens, homes, open-air restaurants or outdoor leisure venues to provide moderate lighting, and to create an atmosphere and decorate the surrounding environment. In addition, present existing outdoor lamps also have a solar panel that utilizes solar energy to provide power for the operation, which has the advantage of environmental protection and energy saving. The outdoor lamps of this sort are generally disc-shaped and buried in the ground, and capable of emitting light upward from the top of the outdoor lamps. For example, the U.S. Pat. Nos. 10,619,810, 10,995,918, and 11,333,333 previously filed by and granted to the present discloser are typical embodiments.

The present inventor has considered that most of the aforementioned outdoor lamps are installed on the ground, and are susceptible to being stepped on by people, run over by vehicles, or collided with, resulting in distortion and deformation, rupture, damage, and other problems of the outer casing of the lamps, which adversely affects the service life of the lamps. In order to overcome these problems, the present discloser, based on the years of research and experiment on the function of the outdoor lamp products, and focused on the above existing outdoor lamps to enhance the pressure resistance and impact resistance of the outdoor lamps.

SUMMARY OF THE DISCLOSURE

Specifically, the present disclosure provides a pressure-resistant outdoor lamp structure, including:

a base, including an outer periphery wall, a fixed platform arranged on the base, a compartment arranged at the center of the fixed platform, and a ring-shaped groove arranged between the perimeter of the fixed platform and the outer periphery wall of the base;

a lamp cover, assembled to the top of the base, and comprising a translucent board covering the fixed platform of the base, a ring-shaped border extending downward from the perimeter of the translucent board, and a ring-shaped bottom edge formed at the bottom of the ring-shaped border and fixed to the ring-shaped groove; and a solar lighting module, including a circuit board, a solar panel, a plurality of LEDs and a batter electrically coupled to each other, the circuit board being stacked on the fixed platform, the battery being installed in the compartment, the solar panel and the plurality of LEDs being disposed on the circuit board and installed to the bottom of the translucent board; and a first pressure-resistant module, comprising a plastic ring, and a plurality of first plastic block extending outward from the plastic ring, the plastic ring being mounted around the ring-shaped groove of the base, and pressed and fixed by the ring-shaped bottom edge of the lamp cover, the plurality of first plastic blocks being arranged with a space from each other and around the outer periphery wall of the base, and extending downward along the outer periphery wall of the base to the bottom of the base to form a cushioning part that can be abutted in an external environment.

Compared to the related art, the present disclosure uses a flexible plastic material (such as plastic, rubber, silicone, etc.) to manufacture the plurality of first plastic blocks, and arrange the plurality of first plastic blocks with a spacing from each other and around the outer periphery wall of the base of the outdoor lamp. Based on this structure, the pressure-resistant outdoor lamp is designed to enhance the ability of outdoor lamp to resist external impact and compression and the service life of the outdoor lamp.

The objectives, technical characteristics and effects of the present invention will become apparent with the detailed description of preferred embodiments accompanied with the illustration of related drawings. It is intended that the embodiments and drawings disclosed herein are to be considered illustrative rather than restrictive.

DESCRIPTION OF THE PREFERRED EMBODIMENTS

Figure 1:
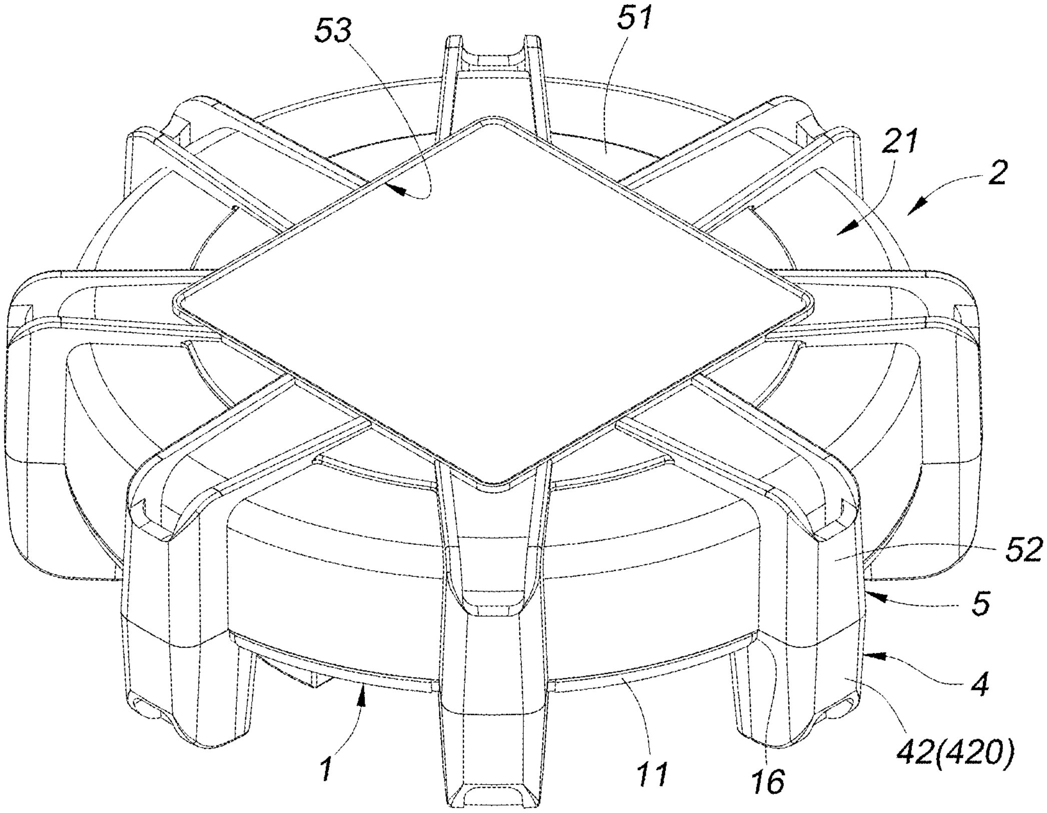
FIG. 1 is a perspective view of the present disclosure.

With reference to FIGS. 1 to 4 for a pressure-resistant outdoor lamp structure of the present disclosure, the pressure-resistant outdoor lamp structure is an assembly structure having a base 1, a lamp cover 2, a solar lighting module 3, a first pressure-resistant module 4 and a second pressure-resistant module 5. The base 1 is in the shape of a round disc with an outer periphery wall 11, a fixed platform 12 on the top of the base 1, and a concave compartment 13 at the center of the fixed platform 12.

A ring-shaped groove 14 is formed between the periphery of the fixed platform 12 and the outer periphery wall 11 of the base 1. Specifically, periphery of the fixed platform 12 is provided with a ring-shaped rib 15, such that the ring-shaped groove 14 is formed between the ring-shaped rib 15, the fixed platform 12 and the outer periphery wall 11 of the base 1.

In the figures, the lamp cover 2 is in the shape of a cylinder, assembled to the top of the base 1 and the outer periphery wall 11 of the base 1, the lamp cover 2 includes a translucent board 21 covering the top of the fixed platform 12 of the base 1, a ring-shaped border 22 extending downward from the perimeter of the translucent board 21, and the ring-shaped border 22 has a ring-shaped bottom edge 222 that can be abutted against and fixed to the ring-shaped groove 14.

Figure 3:
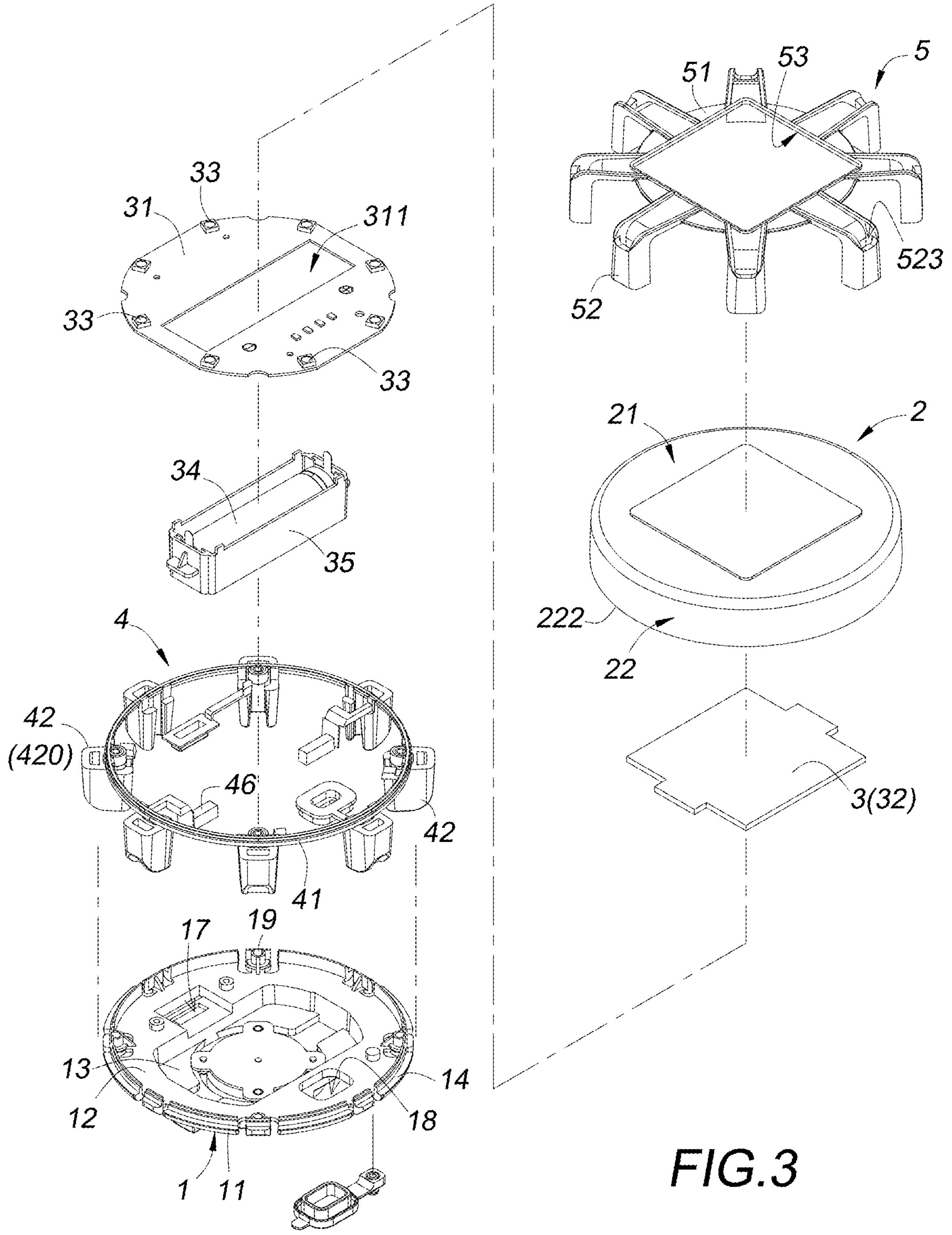
FIG. 3 is an exploded view of FIG. 1.
Figure 5:
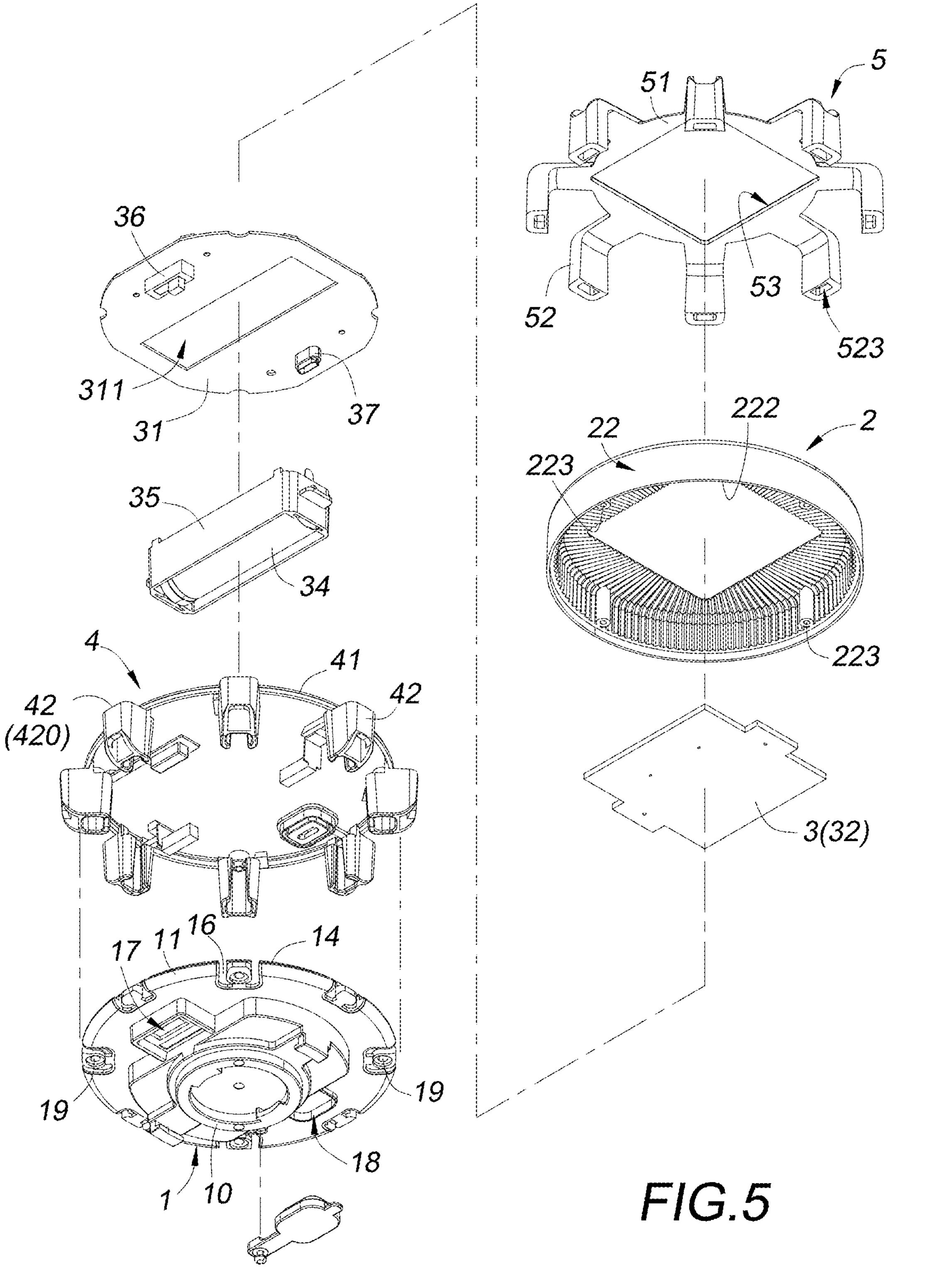
FIG. 5 is an exploded view of FIG. 2.
Figure 8:
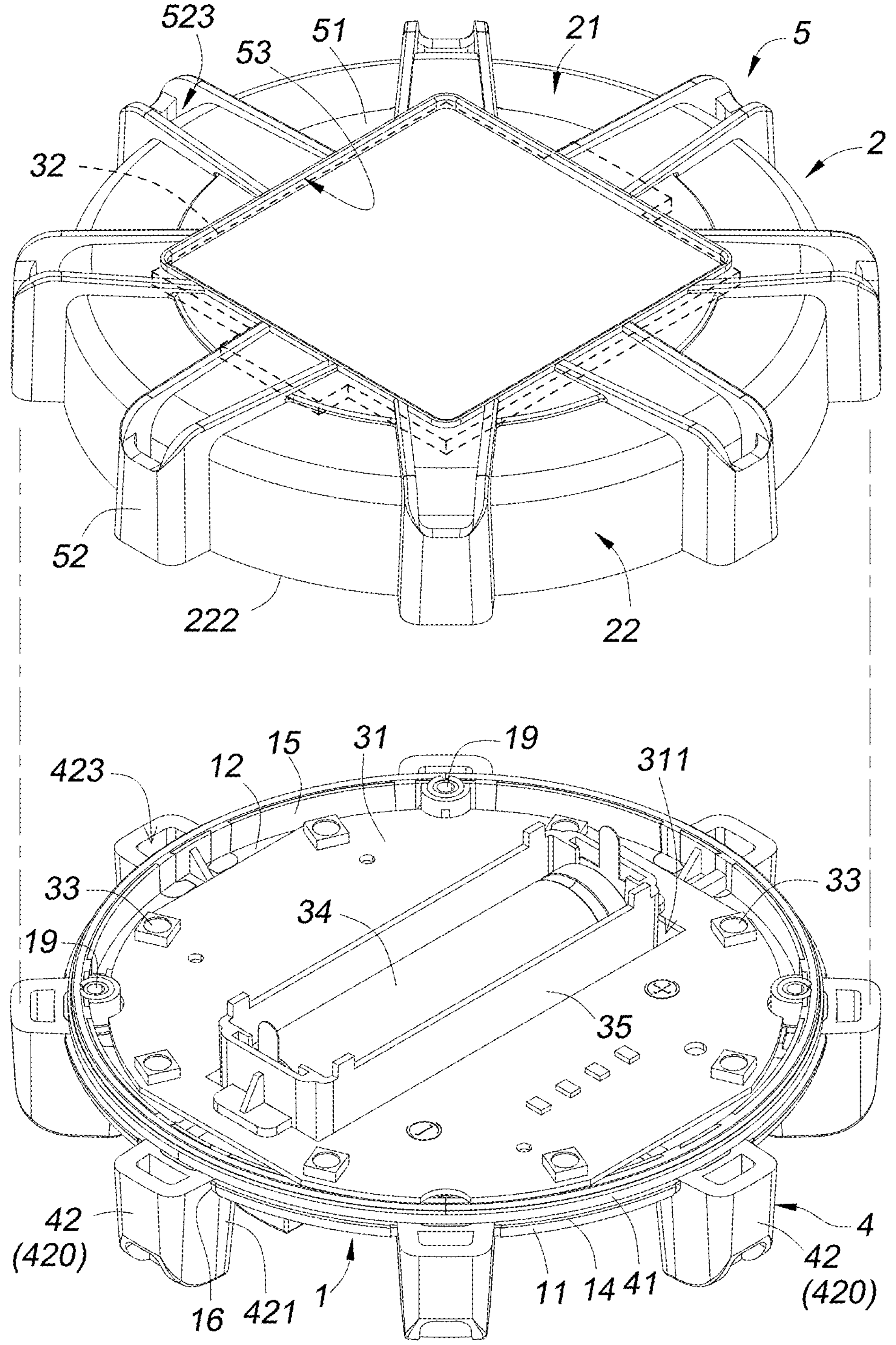
FIG. 8 is an exploded view of another part of FIG. 1.

In FIGS. 3, 5 and 8, the solar lighting module 3 includes a circuit board 31, a solar panel 32, plurality of LEDs 33 and a battery 34 electrically coupled to each other, the bottom of the circuit board 31 is stacked on the fixed platform 12, and the battery 34 is installed in the compartment 13. The solar panel 32 and the plurality of LEDs 33 are disposed on the circuit board 31 and configured to be under the translucent board 21.

Specifically, the center of the circuit board 31 is provided with an opening 311 corresponding to the compartment 13, the battery 34 is installed in a battery box 35, the battery box 35 is fixed into the opening 311 and the compartment 13, the height of the battery box 35 is higher than the fixed platform 12, the solar panel 32 is stacked on the top of the battery box 35, the LEDs 33 are installed at the top side of the circuit board 31, and the LEDs 33 are soldered directly onto the circuit at the top side of the circuit board 31 and spaced with each other and around the periphery of the solar panel 32. The circuit board 31, the solar panel 32 and the battery box 35 (battery 34) are electrically coupled to each other by electric wires.

Figure 4:
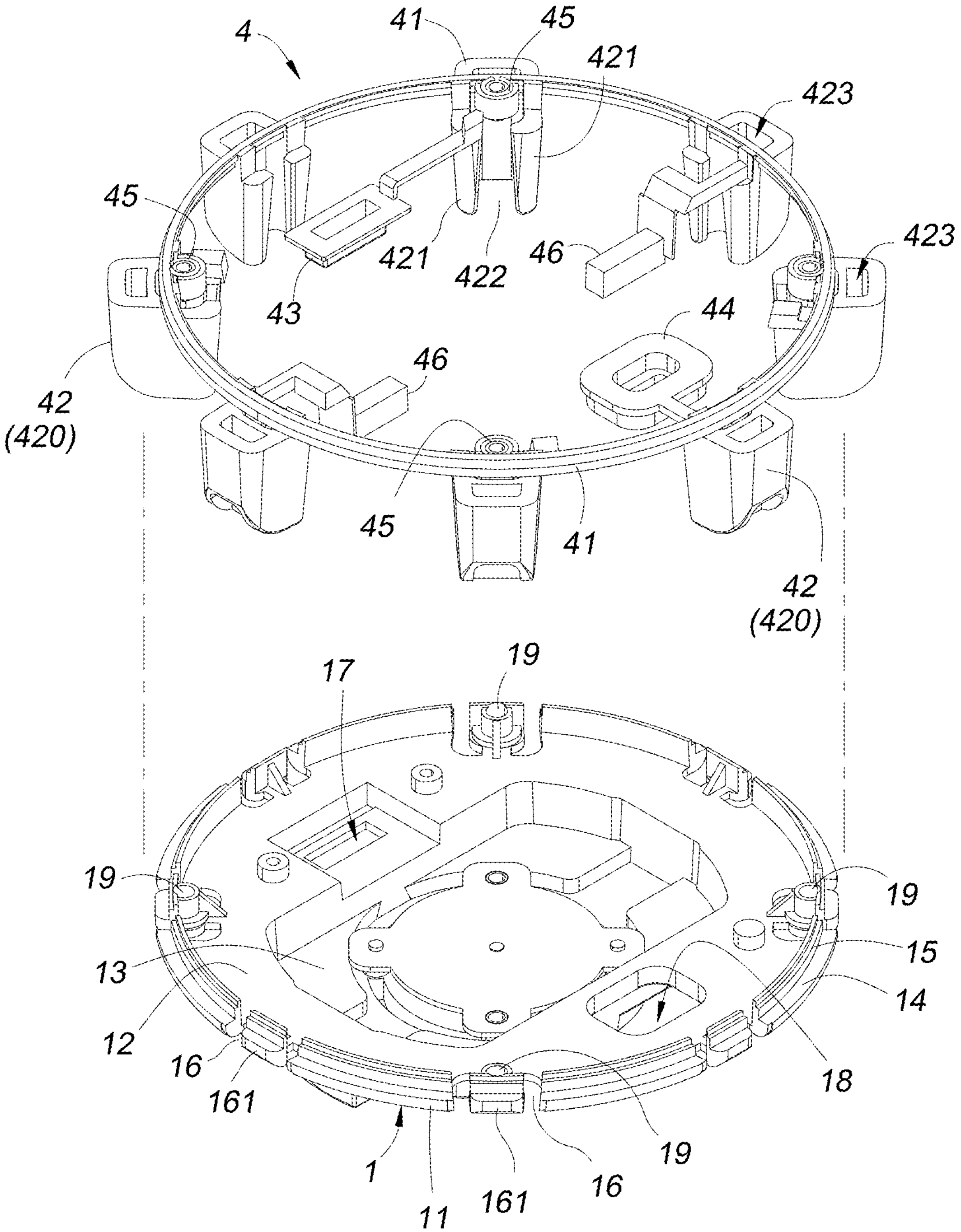
FIG. 4 is an exploded view of a base and a first pressure-resistant module as depicted in FIG. 1.
Figure 6:
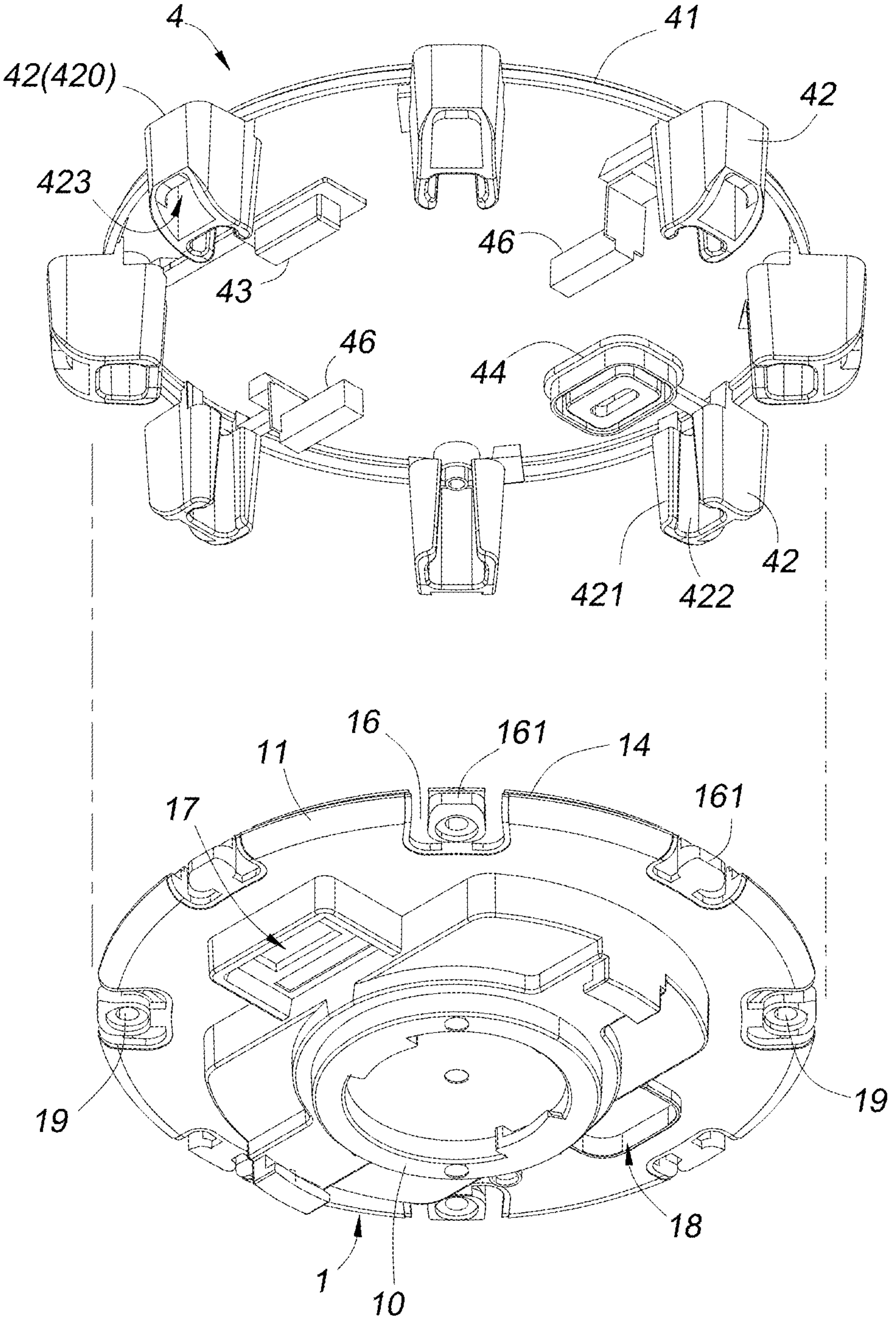
FIG. 6 is an exploded view of the base and the first pressure-resistant module as depicted in FIG. 2.
Figure 7:
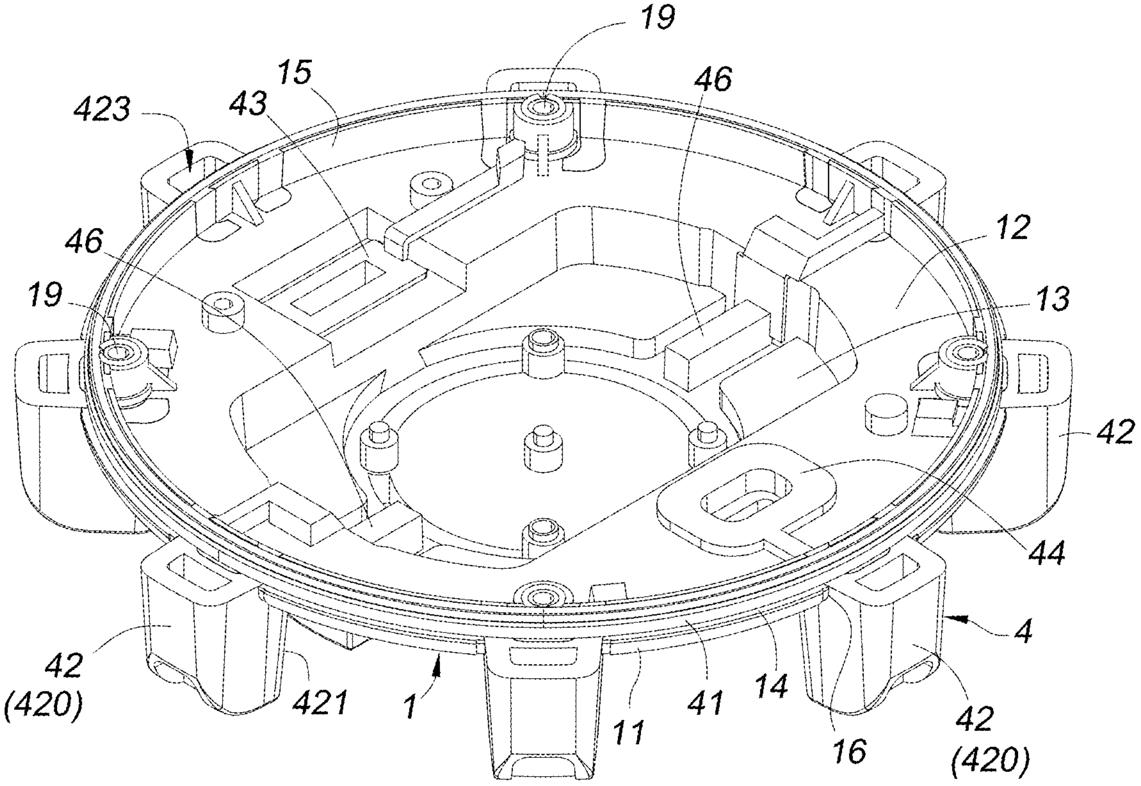
FIG. 7 is an exploded view of a part of FIG. 1.
Figure 9:
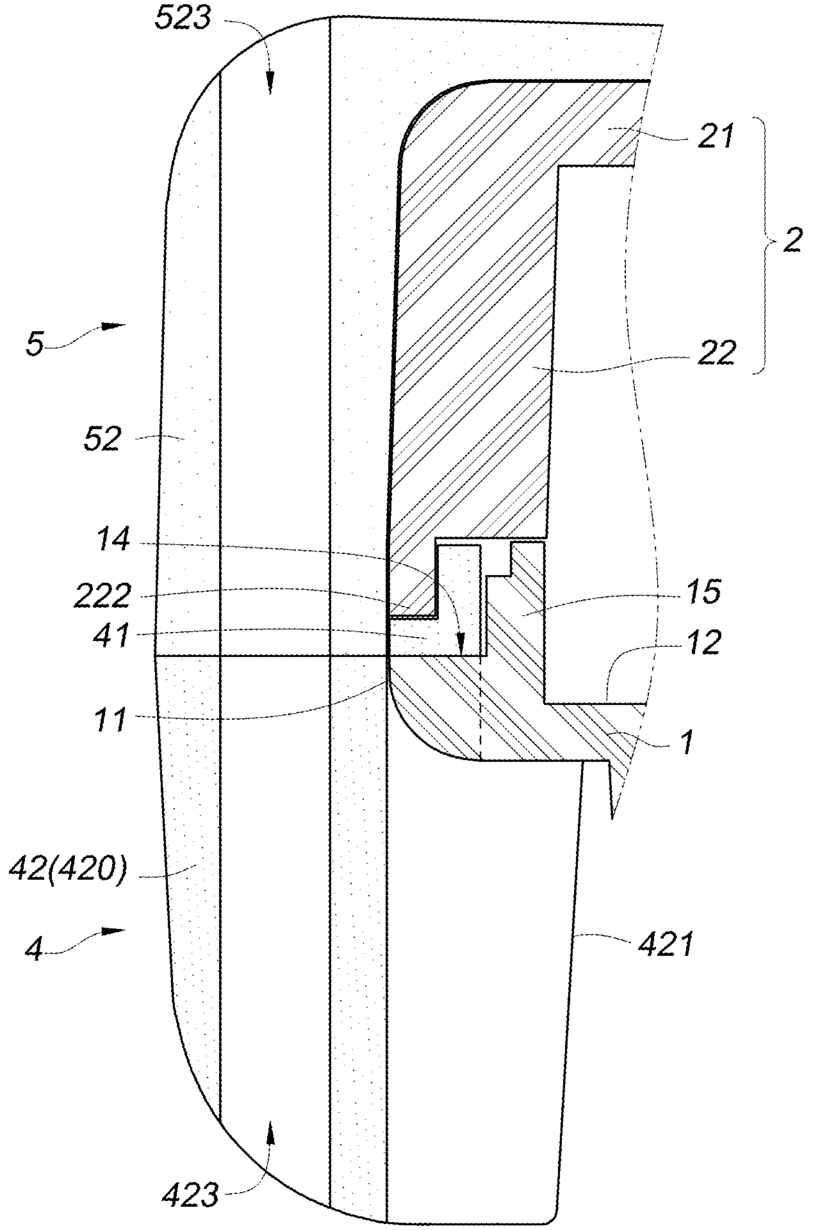
FIG. 9 is a partial cross-sectional view of FIG. 1.

With reference to FIGS. 4 and 6 for a preferred embodiment, the first pressure-resistant module 4 includes a plastic ring 41, and a plurality of first plastic blocks 42 extending outward from the plastic ring 41. As shown in FIGS. 7 to 9, the plastic ring 41 is arranged around the ring-shaped groove 14 and pressed and fixed by the ring-shaped bottom edge 222 of the lamp cover 2, such that the ring-shaped bottom edge 222 of the lamp cover 2 can be closed fitted with the fixed platform 12 to achieve the waterproof effect.

The plurality of first plastic blocks 42 is spaced from each other and arranged around the outer periphery wall 11 of the base 1 and they extend downward along the outer periphery wall 11 of the base 1 to the bottom of the base 1 to form a cushioning part 420 that can be abutted in an external environment. In FIGS. 4 and 7, in order to enhance the stability of fixing the first pressure-resistant module 4 onto the base 1, the outer periphery wall 11 of the base 1 is provided with a groove 16 at a position corresponding to each first plastic block 42, the inner side of each first plastic block 42 is provided with a protruding part 421 in contact with the outer periphery wall 11 of the base 1 and cab be embedded in the corresponding groove 16, the protruding part 421 is provided with a buckle slot 422, the inside of the groove 16 is provided with a buckle part 161 that can connect the corresponding buckle slot 422, such that each first plastic block 42 is stably fixed and positioned on the outer periphery wall 11 of the base 1.

In FIGS. 1 to 5, the second pressure-resistant module 5 includes a top frame 51 and a plurality of second plastic blocks 52 extending radially outward from the top frame 51, the top frame 51 is fixed to the top of the translucent board 21 by an adhesion or snap-on method, the plurality of second plastic blocks 52 is spaced from each other and arranged around the periphery of the ring-shaped border 22, each second plastic block 52 extends downward from the translucent board 21 to a position near the ring-shaped groove 14, and the bottom of each second plastic block 52 and the top of the corresponding first plastic block 42 are engaged with each other by a contact, snap-on, or adhesion method.

The center of the top frame 51 corresponding to the solar panel 32 is provided with a window 53. In addition, the gap between every two adjacent second plastic blocks 52 is provided for the plurality of LEDs 33 to transmit light. In use, sunlight may pass through the lamp cover 2, the translucent board 21 and the window 53 to illuminate the solar panel 32, driving the solar panel 32 to charge the battery 34. In addition, the battery 34 supplies power to the circuit board 31 and the plurality of LEDs 33 to drive the plurality of LEDs 33 to emit lights upward through the lamp cover 2, the translucent board 21 and the ring-shaped border 22, causing the light to scatter upward and around.

It can be understood that the present disclosure uses the flexible plastic material (such as plastic, rubber, silicone, etc.) to manufacture the plurality of first plastic blocks 42 and the second plastic block 52. With the structural design of the plastic ring 41, the groove 16 and the protruding part 421, the plurality of first plastic blocks 42 can be stably spaced and fixed on the outer periphery wall 11 of the base 1. With the structural design of top-bottom engagement of the top frame 51, the plurality of first plastic blocks 42 and the plurality of second plastic blocks 52, the plurality of second plastic blocks 52 can be stably spaced and fixed around the ring-shaped border 22. In this way, the flexible plastic material is set around the whole housing assembly including the base 1 and the lamp cover 2 of the outdoor lamp to provide the pressure-resistant design of the outdoor lamp, so as to enhance the ability of the outdoor lamp to resist external impact and compression and to enhance the durability and service life of the outdoor lamp.

Embodiments of each component is further described as follows:

In FIGS. 2 to 5, the bottom of the base 1 is provided with a switch fixing port 17, the switch fixing port 17 is communicated to the fixed platform 12, the circuit board 31 is electrically connected to a switch 36, and the switch 36 is fixed in the switch fixing port 17, such that the switch 36 is exposed from the bottom of the base 1. The switch 36 can be soldered directly to the bottom side of the circuit board 31.

The switch 36 is provided for users to press or switch in order to turn on/off the LED 33, and switches the circuit board 31 to control the lighting effect of the plurality of LEDs 33. For example, after the switch 36 is pressed or switched, the light can be switched to white light, or change the RGB colors, so as to provide users more options for the lighting effect.

In a feasible embodiment, the plastic ring 41 extends towards the center of the fixed platform 12 to form a first waterstop sleeve 43 spaced between the switch fixing port 17 and the switch 36. This prevents water from penetrating into the interior of the outdoor lamp through the switch fixing port 17.

In FIGS. 2 to 5, the bottom of the base 1 is provided with a plug-in port fixing port 18, the plug-in port fixing port 18 is communicated to the fixed platform 12, the circuit board 31 is electrically connected to a plug-in port 37 (such as USB Type-C port), and the plug-in port 37 is fixed in the plug-in port fixing port 18, so that the plug-in port 37 is exposed from the base 1. The plug-in port 37 can be soldered directly to the bottom side of the circuit board 31. In use, an external power supply can be connected through the plug-in port 37 to supply power to the circuit board 31 in order to drive the LEDs 33 to emit light as well as charging the battery 34.

In addition, the plastic ring 41 extends towards the center of the fixed platform 12 to form a second waterstop sleeve 44 spaced between the plug-in port fixing port 18 and the plug-in port 37. This prevents water from penetrating into the interior of the outdoor lamp through the plug-in port fixing port 18.

In FIGS. 3 to 5, the bottom of the base 1 is provided with a plurality of screw holes 19, the screw holes 19 are communicated to the fixed platform 12, the bottom of the ring-shaped border 22 is provided with a plurality of screw holes 223, the screw holes 19 of the fixed platform 12 and the screw holes 223 of the ring-shaped border 22 are configured to be corresponsive to each other, so that a plurality of external screws can be passed from the screw holes 19 at the bottom of the base 1 and locked into the corresponding screw holes 223 of the ring-shaped border 22 in order to tightly clamp the plastic ring 41 between the ring-shaped bottom edge 222 of the ring-shaped border 22 and the periphery of the fixed platform 12.

The plastic ring 41 extends towards the center of the fixed platform 12 to form a plurality of third waterstop sleeves 45 sheathing on each screw hole 19. This prevents water from penetrating into the interior of the outdoor lamp through the screw holes 19 of the base 1.

The overall waterproof design of the aforementioned plastic ring 41, first waterstop sleeve 43, second waterstop sleeve 44 and third waterstop sleeve 45 effectively enhance the waterproof ability of the outdoor lamp.

In FIGS. 3 to 7, the plastic ring 41 extends towards the compartment 13 at the center of the fixed platform 12 to form a plurality of support blocks 46 that can support the battery 34 and the battery box 35. Accordingly, the plastic ring 41, first plastic block 42, first waterstop sleeve 43, second waterstop sleeve 44, third waterstop sleeve 45 and support block 46 are integrally formed by a flexible plastic material, not only providing a simple and stable fixation of the plurality of first plastic blocks 42, but also simplifying the production process of the waterstop structures of the outdoor lamp, thereby saving costs.

In FIGS. 8 and 9, a first through hole 423 is formed between the top and bottom of each first plastic block 42 to enhance of the elasticity for the expansion and contraction of the first plastic block 42, a second through hole 523 is formed between the top and bottom of each second plastic block 52 to enhance of the elasticity for the expansion and contraction of the second plastic block 52, and the first through hole 423 is communicated to the corresponding second through hole 523.

Figure 2:
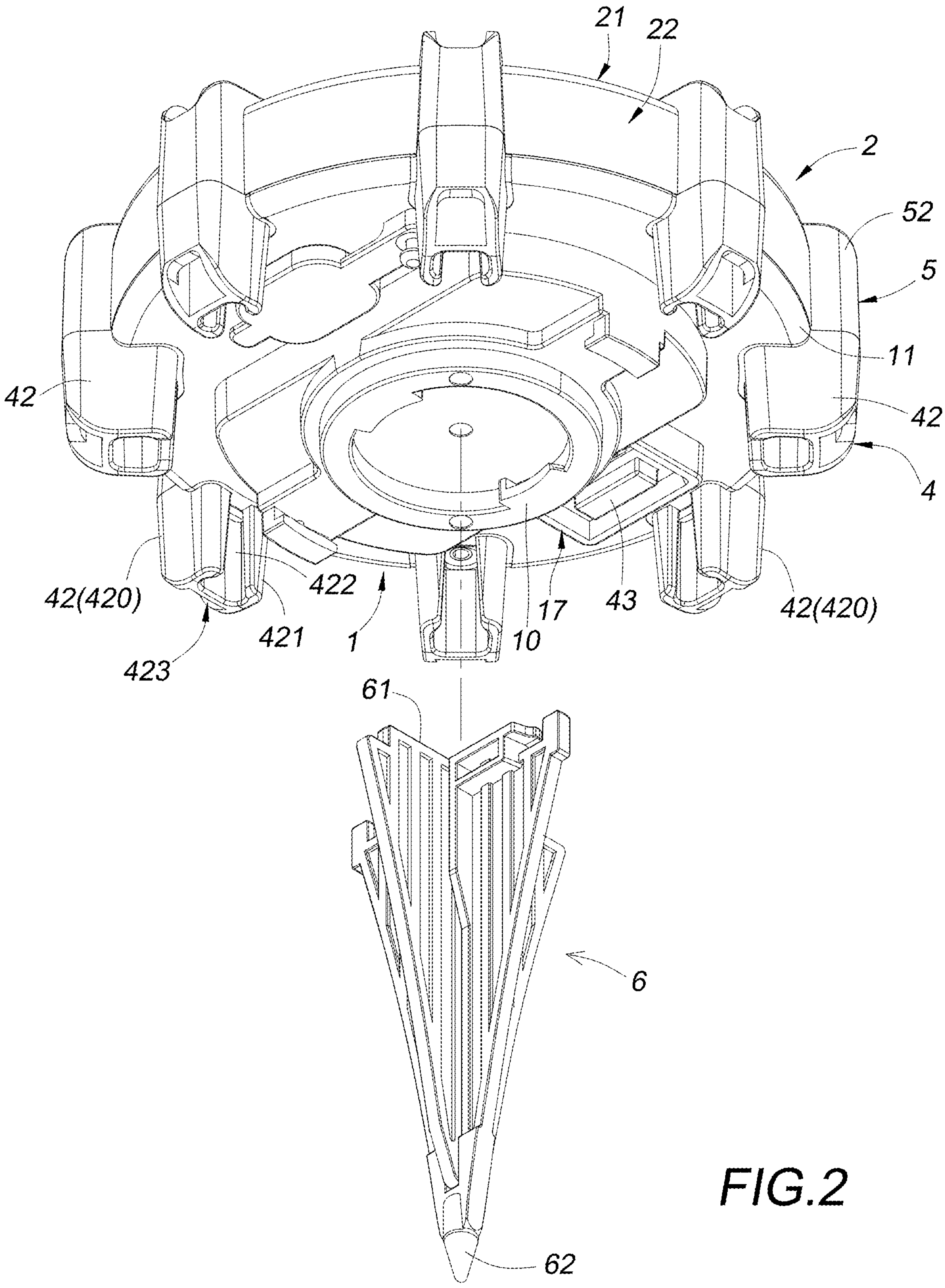
FIG. 2 is a top view of FIG. 1, showing a using status of the present disclosure.
Figure 10:
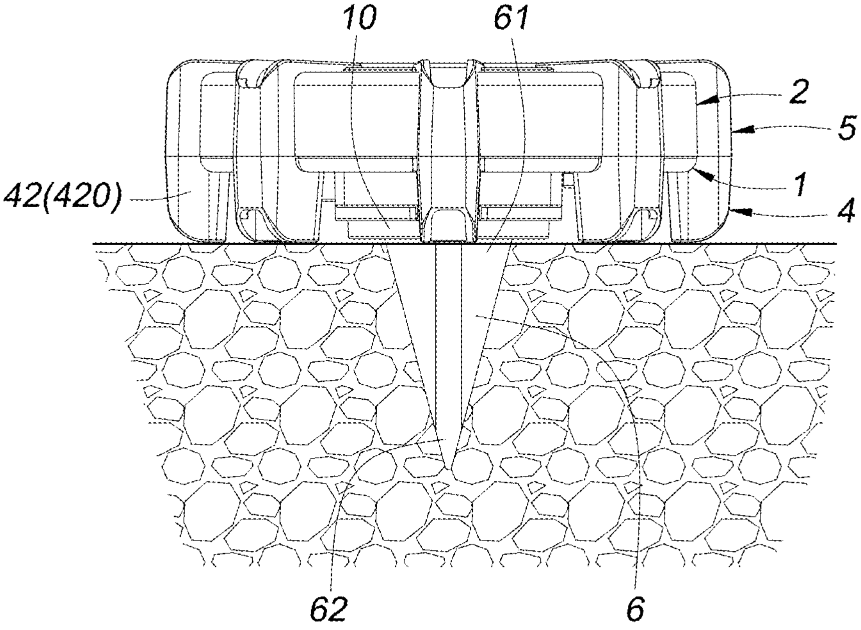
FIG. 10 is a side view of a using status as depicted in FIG. 1.

In FIGS. 2, 5, and 10, the bottom of the base 1 is provided with a combining part 10, the base 1 is detachably assembled with a plug 6 through the combining part 10. The plug 6 is in a conical shape with a wide top and a narrow bottom, and having a mount 61 at the top, and a spike 62 at the bottom which is pluggable into the ground or other planes, and the mount 61 is detachably assembled to the combining part 10 of the base 1. For example, the combining part 10 and the mount 61 can be assembled to each other by a concave-convex structure, so that the outdoor lamp can be fixed to the ground or other planes by the plug 6.

Figure 11:
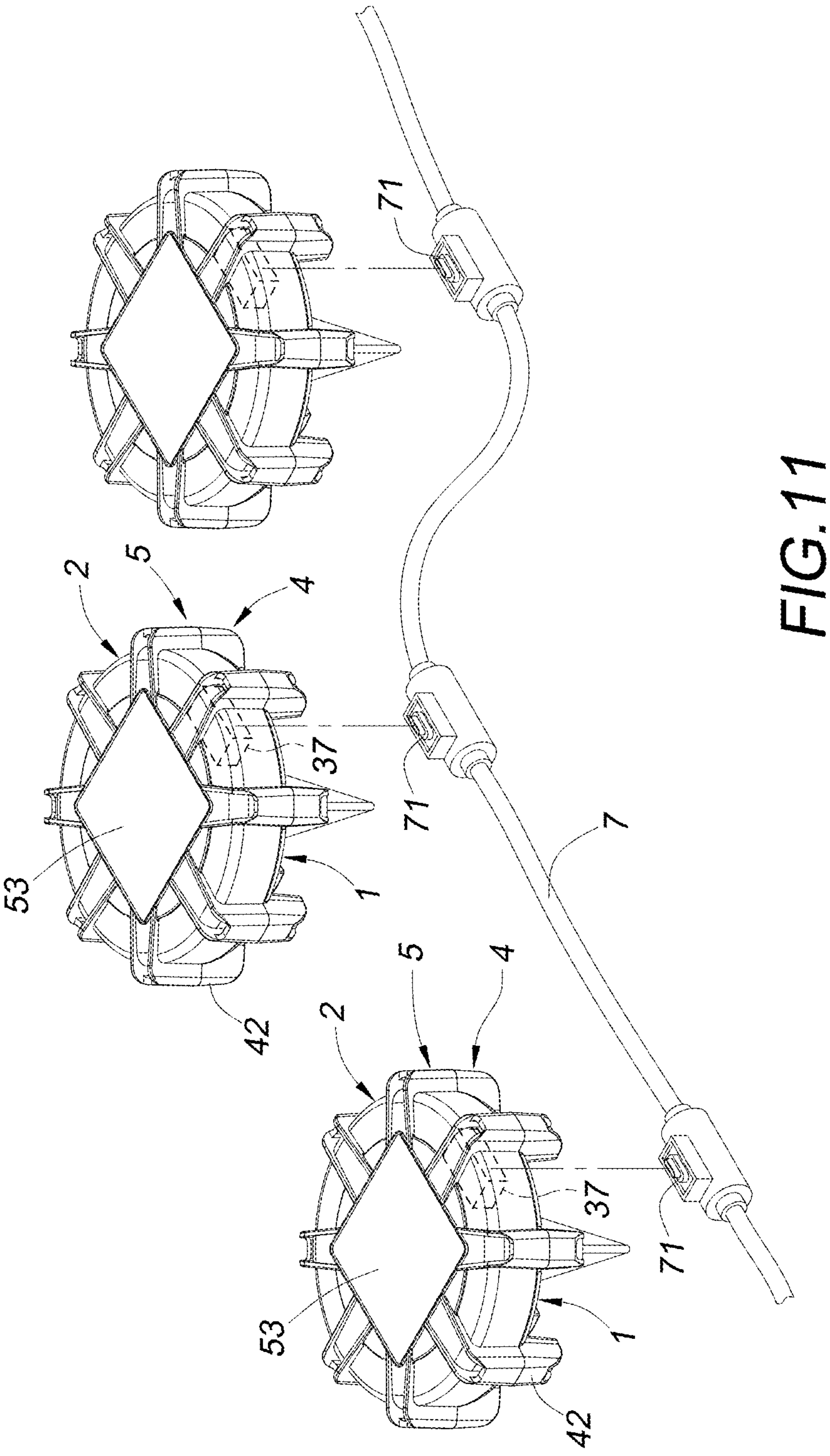
FIG. 11 is a perspective view of another using status as depicted in FIG. 1.

In FIG. 11, the present disclosure further includes a waterproof charging wire 7, the waterproof charging wire 7 can be laid on the ground or other planes, the waterproof charging wire 7 has a plurality of connectors 71 spaced from each other, the plug-in port 37 of the base 1 of the outdoor lamp and the connector 71 of the waterproof charging wire 7 are engaged with each other, so that the waterproof charging wire 7 can supply power to the plurality of plug-in ports 37 of the outdoor lamp through the connectors 71, and a plurality of outdoor lamps can be connected through the waterproof charging wire 7 for use.

While the present disclosure has been described by means of specific embodiments, numerous modifications and variations could be made thereto by those skilled in the art without departing from the scope and spirit of the invention as set forth in the claims.

What is claimed is:

1. A pressure-resistant outdoor lamp structure, comprising:

a base, comprising an outer periphery wall, a fixed platform arranged on the base, a compartment arranged at the center of the fixed platform, and a ring-shaped groove arranged between the perimeter of the fixed platform and the outer periphery wall of the base;

a lamp cover, assembled to the top of the base, and comprising a translucent board covering the fixed platform of the base, a ring-shaped border extending downward from the perimeter of the translucent board, and a ring-shaped bottom edge formed at the bottom of the ring-shaped border and fixed to the ring-shaped groove; and a solar lighting module, comprising a circuit board, a solar panel, a plurality of LEDs and a battery electrically coupled to each other, the circuit board being stacked on the fixed platform, the battery being installed in the compartment, the solar panel and the plurality of LEDs being disposed on the circuit board and installed to the bottom of the translucent board; and a first pressure-resistant module, comprising a plastic ring, and a plurality of first plastic block extending outward from the plastic ring, the plastic ring being mounted around the ring-shaped groove of the base, and pressed and fixed by the ring-shaped bottom edge of the lamp cover, the plurality of first plastic blocks being arranged with a space from each other and around the outer periphery wall of the base, and extending downward along the outer periphery wall of the base to the bottom of the base to form a cushioning part that can be abutted in an external environment.

2. The pressure-resistant outdoor lamp structure according to claim 1, wherein the outer periphery wall of the base is provided with a groove configured to be corresponsive to each first plastic block, the inner side of each first plastic block is provided with a protruding part configured to be in contact with the outer periphery wall of the base and embeddable into the corresponding groove, the protruding part is provided with a buckle slot, and a buckle part installed in the corresponding groove and connectable to the buckle slot.

3. The pressure-resistant outdoor lamp structure according to claim 1, further comprising a second pressure-resistant module, the second pressure-resistant module comprising a top frame, and a plurality of second plastic blocks extending outward from the top frame, the top frame being mounted to the top of the translucent board of the lamp cover, and the plurality of second plastic blocks being spaced from each other, arranged around the ring-shaped border of the lamp cover, and extending downward from the periphery of the ring-shaped border at a position near the translucent board to a position near the ring-shaped groove, and the bottom of each second plastic block being engaged with the top of the corresponding first plastic block.

4. The pressure-resistant outdoor lamp structure according to claim 3, wherein the center of the top frame of the second pressure-resistant module is provided with a window configured to be corresponsive to the solar panel, and the spacing between every two adjacent second plastic blocks is provided for the plurality of LEDs to transmit light.

5. The pressure-resistant outdoor lamp structure according to claim 3, wherein the center of the circuit board is provided with an opening corresponding to the compartment, the battery is installed in a battery box, the battery box is fixed in the opening and the compartment, the height of the battery box is higher than the fixed platform, the solar panel is stacked on the top of the battery box, and the plurality of LEDs is arranged on the circuit board and spaced from each other around the periphery of the solar panel.

6. The pressure-resistant outdoor lamp structure according to claim 5, wherein the bottom of the base is provided with a switch fixing port, the switch fixing port is communicated to the fixed platform, the circuit board is electrically coupled to a switch, the switch is fixed in the switch fixing port, and the plastic ring is provided with a first waterstop sleeve extending towards the center of the fixed platform to be spaced between the switch fixing port and the switch.

7. The pressure-resistant outdoor lamp structure according to claim 5, wherein the bottom of the base is provided with a plug-in port fixing port, the plug-in port fixing port is communicated to the fixed platform, the circuit board is electrically coupled to a plug-in port, the plug-in port is fixed in the plug-in port fixing port, the plastic ring of the first pressure-resistant module extends towards the center of the fixed platform to form a second waterstop sleeve spaced between the plug-in port fixing port and the plug-in port.

8. The pressure-resistant outdoor lamp structure according to claim 5, wherein the bottom of the base is provided with a plurality of screw holes, the screw holes are communicated to the fixed platform, the plastic ring of first pressure-resistant module extends towards the center of the fixed platform to form a plurality of third waterstop sleeves sheathing on the screw holes respectively.

9. The pressure-resistant outdoor lamp structure according to claim 5, wherein the plastic ring of the first pressure-resistant module extends towards the inside of the compartment at the center of the fixed platform to form a plurality of support blocks capable of supporting the battery box.

10. The pressure-resistant outdoor lamp structure according to claim 5, wherein each first plastic block of the first pressure-resistant module is provided with a first through hole, each second plastic block of the second pressure-resistant module is provided with a second through hole, and the first through hole is communicated to the corresponding second through hole.

11. The pressure-resistant outdoor lamp structure according to claim 5, wherein the bottom of the base is provided with a combining part, and the base is detachably assembled with a plug by the combining part.

12. The pressure-resistant outdoor lamp structure according to claim 5, further comprising a waterproof charging wire, a plurality of connectors spaced from each other and arranged on the waterproof charging wire, and the plug-in port of the base and the connector of the waterproof charging wire are engaged with each other.

13. The pressure-resistant outdoor lamp structure according to claim 5, wherein the perimeter of the fixed platform is provided with a ring-shaped rib, and the ring-shaped groove is formed between the ring-shaped rib, the fixed platform and the outer periphery wall of the base.

* * * * *